US012759502B2

(12) United States Patent
Szewczyk et al.

(10) Patent No.: US 12,759,502 B2
(45) Date of Patent: Oct. 13, 2026

(54) ENERGY ABSORBING SEATBELT ASSEMBLY

(71) Applicant: JOYSON SAFETY SYSTEMS ACQUISITION LLC, Auburn Hills, MI (US)

(72) Inventors: Alexander Szewczyk, Rochester, MI (US); Mark Gray, Macomb, MI (US); Shaun Streett, Commerce, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 19/128,773

(22) PCT Filed: Nov. 8, 2023

(86) PCT No.: PCT/US2023/079103
§ 371 (c)(1),
(2) Date: May 9, 2025

(87) PCT Pub. No.: WO2024/102822
PCT Pub. Date: May 16, 2024

(65) Prior Publication Data

US 2026/0175813 A1 Jun. 25, 2026

Related U.S. Application Data

(60) Provisional application No. 63/424,287, filed on Nov. 10, 2022.

(51) Int. Cl.
*B60R 22/28* (2006.01)
*B60R 22/18* (2006.01)

(52) U.S. Cl.
CPC .............. *B60R 22/28* (2013.01); *B60R 22/18* (2013.01); *B60R 2022/1806* (2013.01); *B60R 2022/281* (2013.01); *B60R 2022/287* (2013.01)

(58) Field of Classification Search
CPC . B60R 22/28; B60R 22/18; B60R 2022/1806; B60R 2022/281;
(Continued)

(56) References Cited

U.S. PATENT DOCUMENTS 2,825,581 A * 3/1958 Knight .................. B64D 25/06
242/384
3,532,381 A * 10/1970 Klein ...................... B60R 22/26
297/475
(Continued)

FOREIGN PATENT DOCUMENTS

CN 1789045 A 6/2006
CN 201457296 U 5/2010
(Continued)

OTHER PUBLICATIONS

International Search Report and Written Opinion, mailed Jan. 19, 2024, received in connection with corresponding International Patent Application No. PCT/US2023/079103.
(Continued)

*Primary Examiner* — Jason D Shanske
*Assistant Examiner* — Matthew Joseph Ganci
(74) *Attorney, Agent, or Firm* — Meunier Carlin & Curfman LLC

(57) ABSTRACT

An energy absorbing seatbelt assembly according to various implementations comprises a frame, a first spool portion, and a separately formed second spool portion, wherein both spool portions are rotatably coupled to the frame. A torsion bar comprises a first end coupled to the first spool portion and a second end coupled to the second spool portion, wherein both ends of the torsion bar rotate in opposite directions as the first and second spool portions rotate relative to the frame. The energy absorbing seatbelt assembly further comprises a cable with a first end coupled to the
(Continued)

first spool portion, a second end coupled to the second spool portion, and a middle portion coupled to a seatbelt buckle or anchor, the middle portion of the cable extending between the first end of the cable and the second end of the cable.

20 Claims, 21 Drawing Sheets

(58) Field of Classification Search
CPC ............ B60R 2022/287; B60R 21/055; B60R 22/341; B60R 22/4676; B60R 2022/288; B60R 2022/289; B60R 2022/3424
See application file for complete search history.

(56) References Cited

U.S. PATENT DOCUMENTS

| | | | | | |
|---|---|---|---|---|---|
| 4,303,209 | A | * | 12/1981 | Stephenson | B60R 22/44 280/808 |
| 5,409,176 | A | | 4/1995 | Kopetzky | |
| 5,560,565 | A | * | 10/1996 | Merrick | B60R 22/105 297/476 |
| 6,053,532 | A | | 4/2000 | Wilkins et al. | |
| 6,302,346 | B1 | | 10/2001 | Brown et al. | |
| 6,682,009 | B1 | * | 1/2004 | Frank | B60R 22/3413 242/379.1 |
| 7,038,153 | B2 | | 5/2006 | Zamecnik | |
| 7,201,399 | B2 | * | 4/2007 | Frank | B60R 22/02 297/484 |
| 7,686,716 | B2 | | 3/2010 | Matsumoto et al. | |
| 11,046,284 | B2 | | 6/2021 | Betz | |
| 11,052,866 | B2 | | 7/2021 | Moeker | |
| 2018/0319361 | A1 | | 11/2018 | Faruque et al. | |
| 2020/0317157 | A1 | | 10/2020 | Effenberger | |

FOREIGN PATENT DOCUMENTS

| | | | | | |
|---|---|---|---|---|---|
| CN | 209366090 | U | | 9/2019 | |
| CN | 110198870 | B | | 7/2022 | |
| DE | 102005060913 | A1 | | 6/2007 | |
| DE | 102017101807 | A1 | | 6/2018 | |
| DE | 102017201016 | A1 | | 7/2018 | |
| DE | 102017204508 | A1 | | 9/2018 | |
| DE | 102017223333 | A1 | | 6/2019 | |
| GB | 2349615 | B | | 9/2002 | |
| GB | 2522335 | A | * | 7/2015 | B60R 22/28 |
| GB | 2564707 | A | * | 1/2019 | B60R 22/34 |
| JP | H0867232 | A | | 3/1996 | |
| WO | WO-2014179468 | A1 | * | 11/2014 | A44B 11/125 |
| WO | 2018108857 | A1 | | 6/2018 | |
| WO | 2018134382 | A1 | | 7/2018 | |
| WO | 2018167251 | A1 | | 9/2018 | |
| WO | 2018234537 | A1 | | 12/2018 | |

OTHER PUBLICATIONS

International Preliminary Report on Patentability for International Application No. PCT/US2023/079103, dated May 22, 2025, 7 Pages.

* cited by examiner

ENERGY ABSORBING SEATBELT ASSEMBLY

CROSS-REFERENCE TO RELATED APPLICATIONS

This application is a U.S. National Stage Application filed under 35 U.S.C. § 371 of PCT/US2023/079103, filed on Nov. 8, 2023, which claims the benefit of U.S. Provisional Patent Application No. 63/424,287 filed on Nov. 10, 2022, the entire contents of which are incorporated herein by reference.

TECHNICAL FIELD

The present disclosure relates to safety devices for passenger vehicles. In particular, the disclosure relates to an energy absorbing seatbelt assembly. Passenger vehicles may include, for example, automobiles, boats, trains, aircrafts, and spacecrafts.

BACKGROUND

Most energy absorbing seatbelt assemblies, such as a seatbelt retractor, relate to the portion of the seatbelt webbing that runs along the chest and shoulder of a vehicle occupant. By absorbing energy throughout a vehicle emergency event, the occupant can be slowed down gradually and therefore the high forces experienced in the vehicle emergency event can be absorbed in the safest and most efficient manner. Some vehicles, however, may require energy absorption related to the portion of the seatbelt webbing that extends across the lap of the occupant. Such an energy absorbing seatbelt assembly could be incorporated with a seatbelt buckle assembly or a seatbelt anchor assembly.

In traditional energy absorbing buckle assemblies, for example, a torsion bar is fixedly coupled, directly or indirectly, on one end to a frame and coupled on the other end to a rotating spool. A buckle is coupled to the spool by cables and imparts a rotational force on the spool when the buckle is tensioned due to an occupant's movement during a vehicle emergency event. When the vehicle emergency event is detected, the end of the torsion bar fixedly coupled to the frame will remain fixed in position, whereas the end of the torsion bar coupled to the spool will rotate with the spool. The torsion bar will thus twist and absorb energy. However, by fixing one end of the torsion bar to the frame, significant forces are imparted into the frame, necessitating thicker and stronger materials. Therefore, there is a need for an energy absorbing seatbelt assembly for a lap portion of a seatbelt that can efficiently absorb energy during a vehicle emergency event while minimizing or eliminating forces on the frame of the assembly.

SUMMARY

Various implementations include an energy absorbing seatbelt assembly for a vehicle. The assembly comprises a frame and a first spool portion rotatably coupled to the frame and a second spool portion also rotatably coupled to the frame. The second spool portion is formed separately from the first spool portion. A torsion bar is disposed within the first spool portion and the second spool portion, with a first end coupled to the first spool portion and a second end coupled to the second spool portion. During a vehicle emergency event, the first spool portion rotates relative to the frame in a first direction and the second spool portion rotates relative to the frame in a second direction, the second direction being opposite to the first direction.

In other implementations, an energy absorbing seatbelt assembly for a vehicle comprises a buckle and a frame. A first spool portion is rotatably coupled to the frame and a second spool portion is also rotatably coupled to the frame. The second spool portion is formed separately from the first spool portion. A torsion bar is disposed within the first spool portion and the second spool portion, with a first end coupled to the first spool portion and a second end coupled to the second spool portion. The system further comprises a cable with a first end coupled to the first spool portion, a second end coupled to the second spool portion, and a middle portion coupled to the buckle, wherein the middle portion of the cable extends between the first end of the cable and the second end of the cable. During a vehicle emergency event, the cable is tensioned causing the first spool portion to rotate relative to the frame in a first direction and the second spool portion to rotate relative to the frame in a second direction, the second direction being opposite to the first direction.

In other implementations, an energy absorbing seatbelt assembly for a vehicle comprises a frame and a first spool portion rotatably coupled to the frame and a second spool portion also rotatably coupled to the frame. The second spool portion is formed separately from the first spool portion. A torsion bar is disposed within the first spool portion and the second spool portion, with a first end coupled to the first spool portion and a second end coupled to the second spool portion. The first spool portion comprises a spool extension and the second spool portion comprises a spool cavity, wherein the spool extension extends into the spool cavity and the second spool portion is rotatable about the spool extension. During a vehicle emergency event, the first spool portion rotates relative to the frame and the second spool portion in a first direction and the second spool portion rotates relative to the frame and the first spool portion in a second direction, the second direction being opposite to the first direction.

BRIEF DESCRIPTION OF DRAWINGS

The drawings are merely exemplary to illustrate structure and certain features that can be used singularly or in combination with other features. The disclosure should not be limited to the implementations shown.

DETAILED DESCRIPTION

Figure 1A:
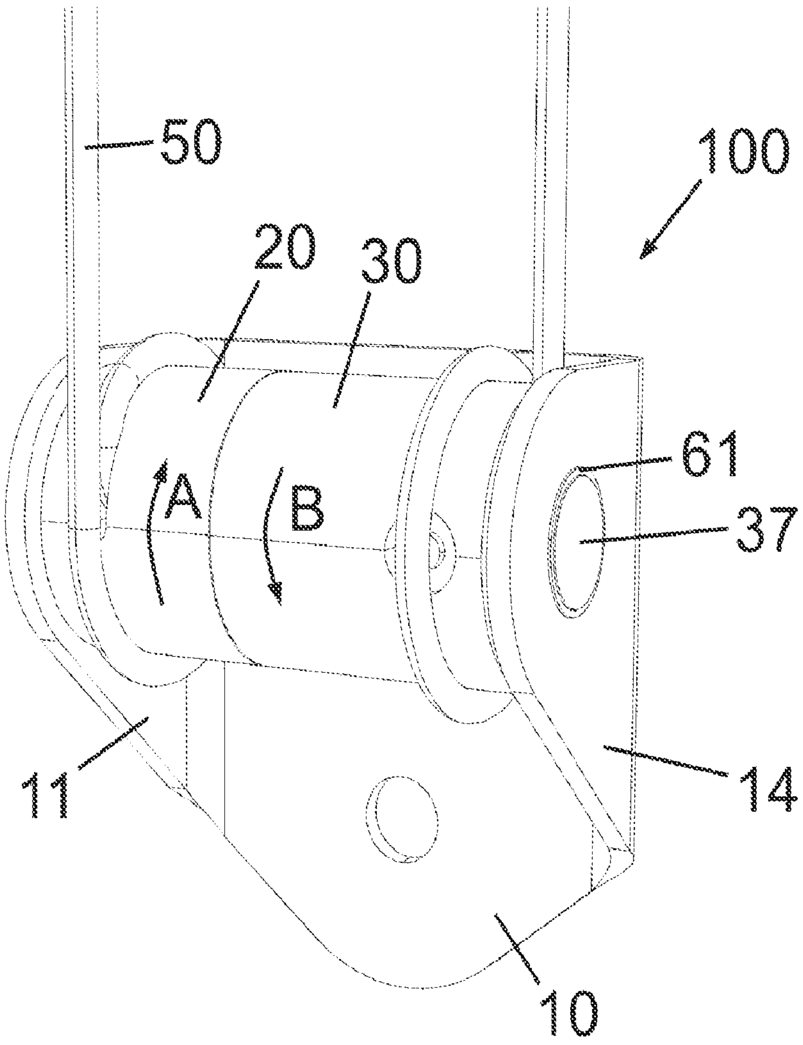
FIG. 1A is a perspective view of an implementation of an energy absorbing seatbelt assembly in a pre-emergency condition.

The present disclosure relates to safety devices for passenger vehicles. The devices, assemblies, systems, and methods disclosed herein provide for an energy absorbing seatbelt assembly comprising a two-piece spool system wherein both spool portions rotate in opposite directions during a vehicle emergency event. In one example, the energy absorbing seatbelt assembly is used for rear seat applications in automobiles. During a vehicle emergency event, a lap portion of a seat belt coupled to a buckle or anchor is tensioned by movement of an occupant's body. This causes the buckle or anchor to tension a cable which is coupled to both spool portions, rotating the spool portions in opposite directions relative to each other. A torsion bar coupled to both spool portions is therefore twisted to absorb energy. By using spool portions that rotate in opposite directions, there is no need to lock one end of the torsion bar to a frame of the energy absorbing seatbelt assembly, therefore allowing more flexibility in material choice for the frame. In other examples, the assembly may be used in other passenger vehicles such as, but not limited to, boats, trains, aircrafts, and spacecrafts. By way of non-limiting example, a vehicle emergency event could include a vehicle accident, a rapid deceleration due to hard braking, or other high-g events such as high-speed turns.

As shown in the FIGURES, one implementation of an energy absorbing seatbelt assembly 100 for a vehicle comprises a frame 10 having a first arm 11, a second arm 14, and a base 17. A first spool portion 20 is rotatably coupled to the frame 10 by a mounting extension 27 which extends into a first hole 12 defined by the first arm 11. A second spool portion 30 is rotatably coupled to the frame 10 by a mounting extension 37 which extends into a second hole 15 defined by the second arm 14. A first bushing 60 is disposed within the first hole 12 between an inner surface 13 of the first hole 12 and the mounting extension 27. A second bushing 61 is disposed within the second hole 15 between an inner surface 16 of the second hole 15 and the mounting extension 37. The first bushing 60 and second bushing 61 allow the first spool portion 20 and the second spool portion 30 to freely rotate relative to the frame 10 with minimal friction. The first bushing 60 and second bushing 61 are formed from acetals. In other implementations, the first bushing and second bushing may be formed from polytetrafluoroethylene (PTFE), nylon, or other plastic materials. In some implementations, the first bushing 60 and second bushing 61 may be coated in a low friction material to ensure smooth rotation, such as molybdenum disulfide or PTFE.

Figure 2A:
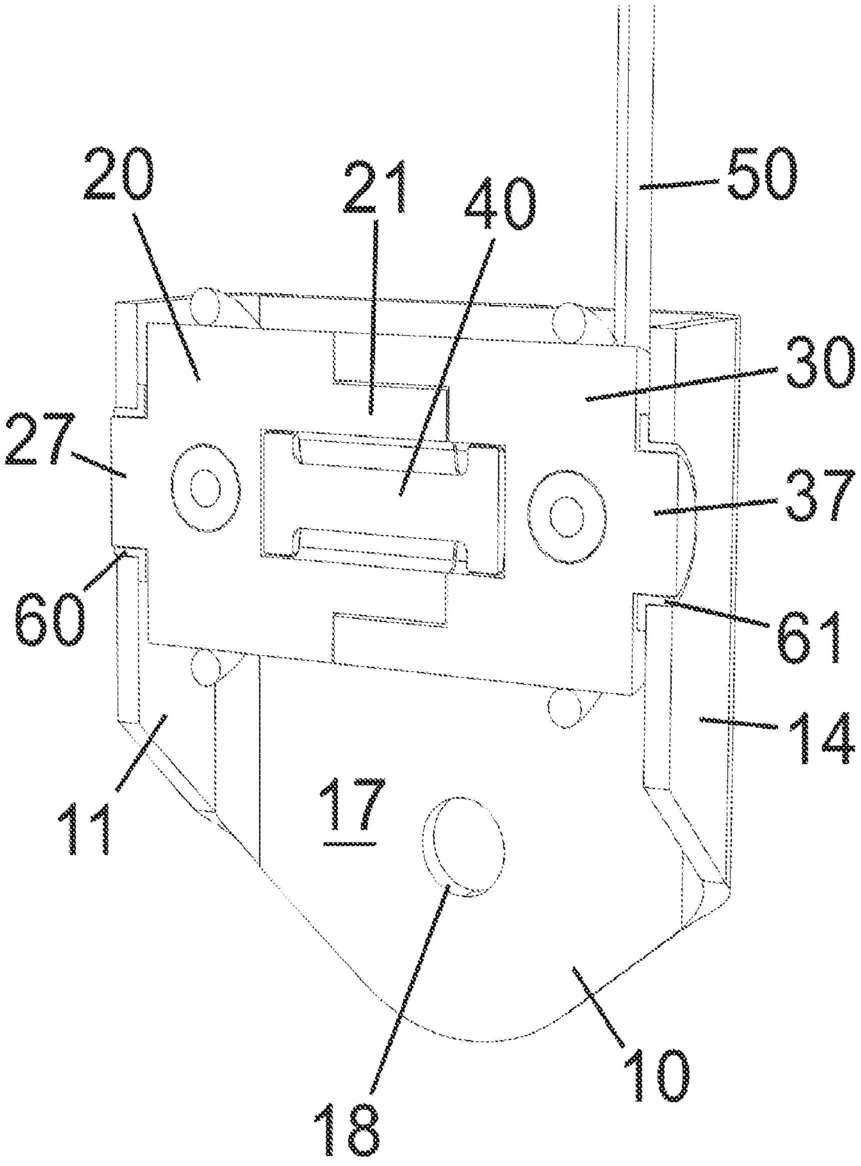
FIG. 2A is a cross-sectional view of the energy absorbing seatbelt assembly of FIG. 1A.

When rotatably coupled to the frame 10, the first spool portion 20 and second spool portion 30 are also rotatably coupled to each other. The first spool portion 20 comprises a spool extension 21 and the second spool portion 30 defines a spool cavity 31. As best shown in FIG. 2A, when the mounting extension 27 and the mounting extension 37 are disposed within the first hole 12 and second hole 15, respectively, the spool extension 21 of the first spool portion 20 is disposed within the spool cavity 31 of the second spool portion 30 allowing the second spool portion 30 to rotate about the spool extension 21. This arrangement allows each of the first spool portion 20 and the second spool portion 30 to freely rotate relative to each other. In some implementations, the spool extension 21 may be coated in a low friction material to ensure smooth rotation, such as molybdenum disulfide or PTFE. In other implementations, a bushing may be disposed around the spool extension to ensure smooth rotation.

Figure 9A:
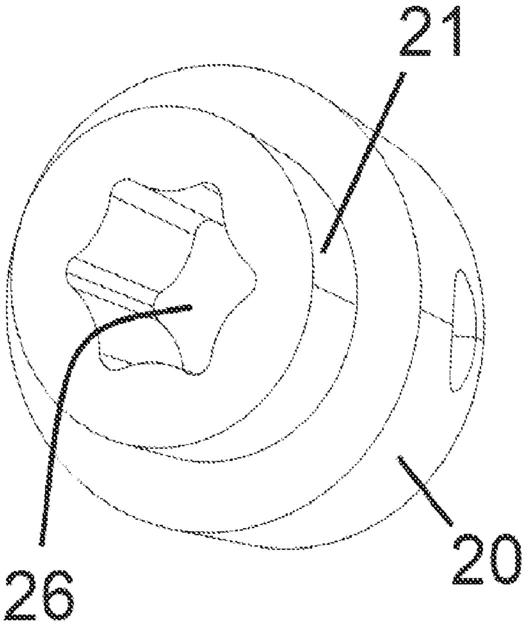
FIG. 9A is a perspective view of the first spool portion of FIGS. 4A-4B showing a torsion bar cavity.
Figure 9B:
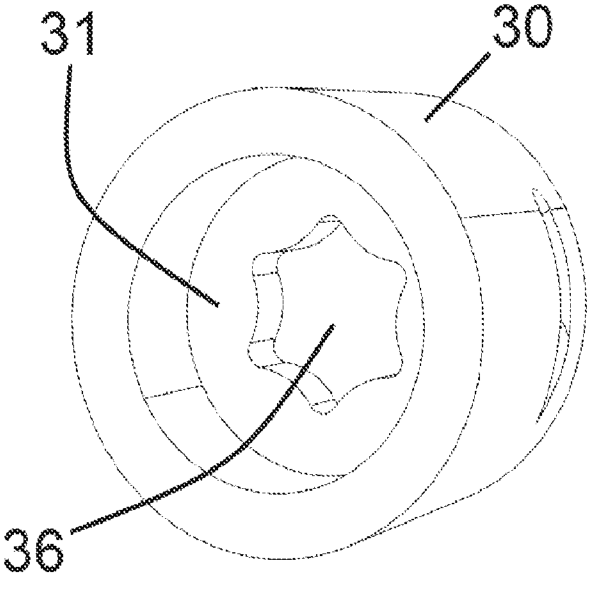
FIG. 9B is a perspective view of the second spool portion of FIGS. 5A-5B showing a torsion bar cavity.
Figure 9C:
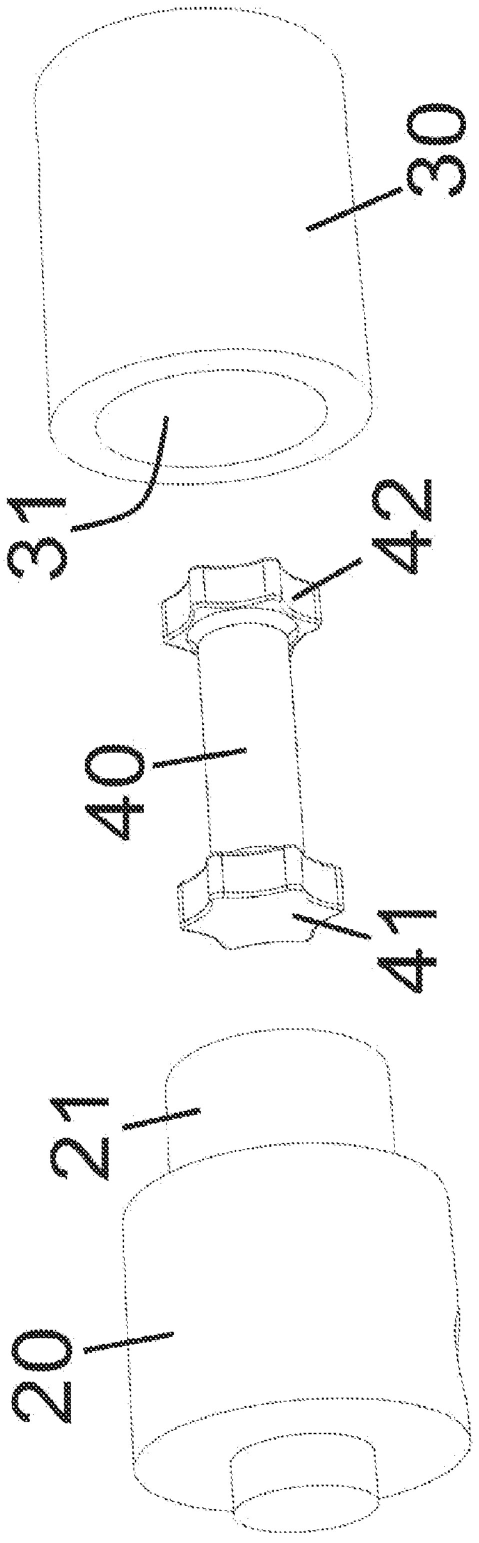
FIG. 9C is an exploded view of the first spool portion of FIG. 9A, the second spool portion of FIG. 9B, and a torsion bar.
Figure 10A:
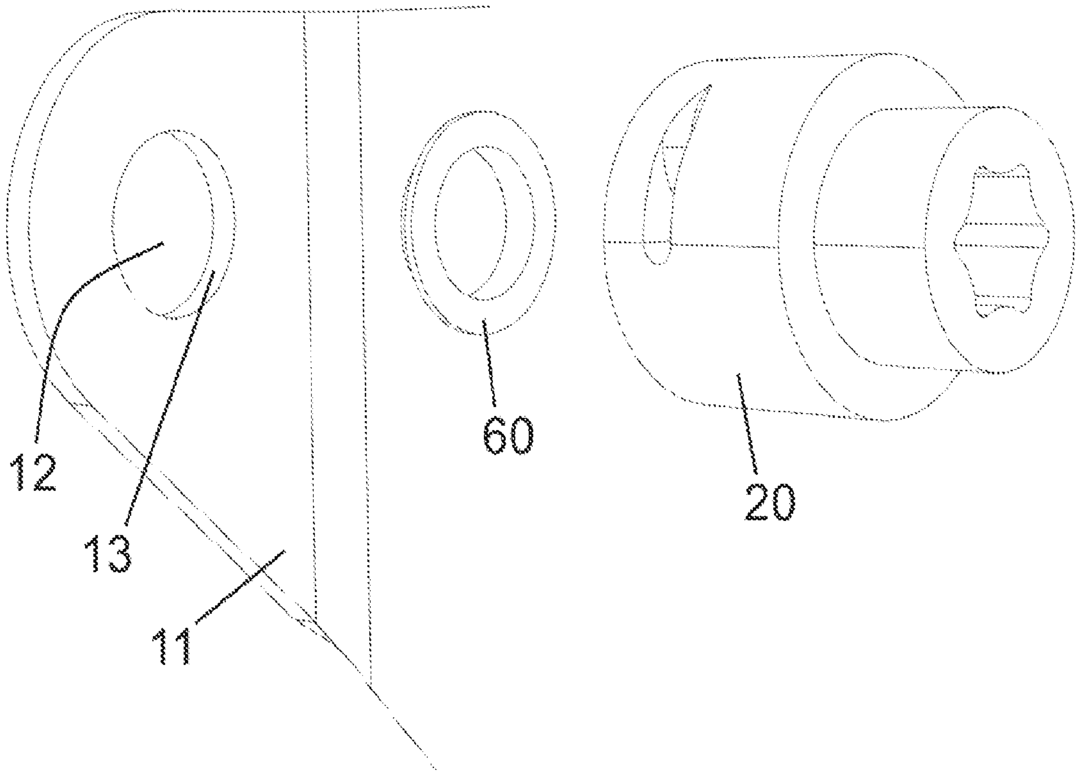
FIG. 10A is an exploded view of the first spool portion of FIG. 9A, a frame, and a first bushing.
Figure 10B:
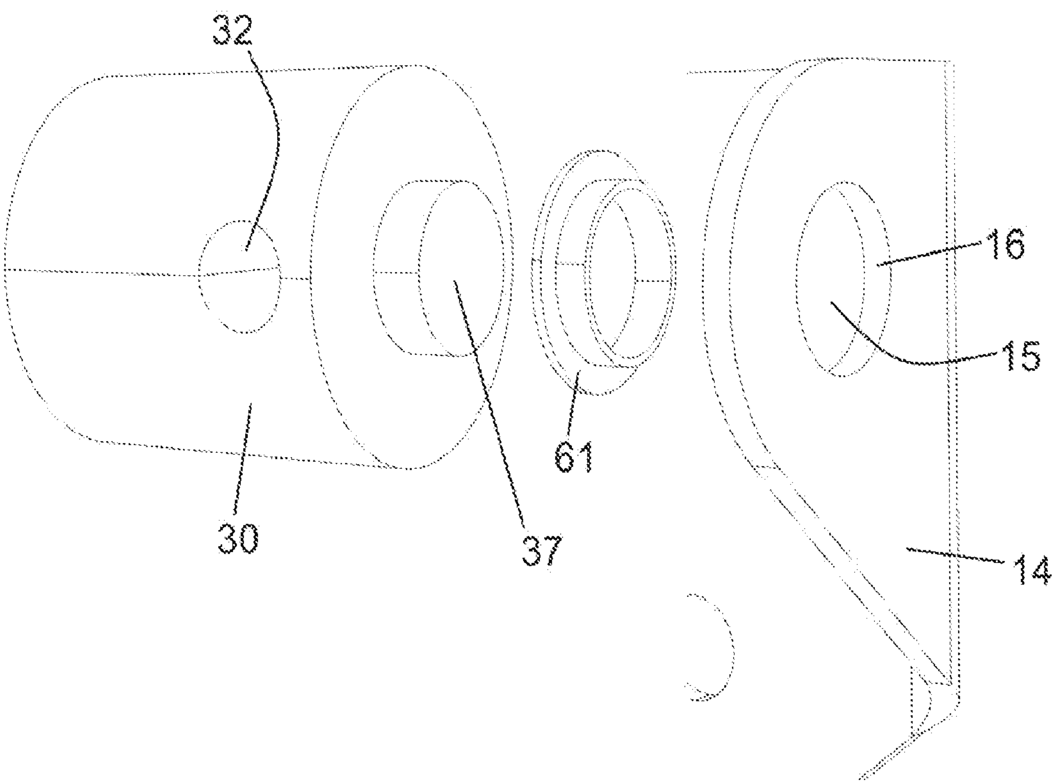
FIG. 10B is an exploded view of the second spool portion of FIG. 9B, the frame, and a second bushing.

To perform the function of energy absorption during a vehicle emergency event, a torsion bar 40 is disposed within the first spool portion 20 and the second spool portion 30. The torsion bar 40 comprises a first end 41 and a second end 42. The first end 41 is disposed within a torsion bar cavity 26 defined by the first spool portion 20, as shown in FIG. 9A. The second end 42 is disposed within a torsion bar cavity 36 defined by the second spool portion 30, as shown in FIG. 9B. The first end 41 and second end 42 comprise a non-circular shape that matches a non-circular shape of the torsion bar cavity 26 and the torsion bar cavity 36. The matching, interlocking shapes of the first end 41 and torsion bar cavity 26 and the second end 42 and torsion bar cavity 36 ensure the first end 41 is coupled to the first spool portion 20 and the second end 42 is coupled to the second spool portion 30. Therefore, when the first spool portion 20 and second spool portion 30 rotate relative to each other, the first end 41 and second end 42 will rotate relative to each other in the same way. As shown in the FIGURES, the non-circular shape is a hexagonal shape. In other implementations, the non-circular shape can be any other type of non-circular shape, including triangular, square, or octagonal, such that the first end of the torsion bar and the second end of the torsion bar can be locked so as to not rotate relative to the first spool portion and the second spool portion, respectively. The torsion bar 40 may be formed from a high elongation steel. In other implementations, the particular material and strength of the torsion bar may be selected based on specific vehicle requirements.

Figure 11A:
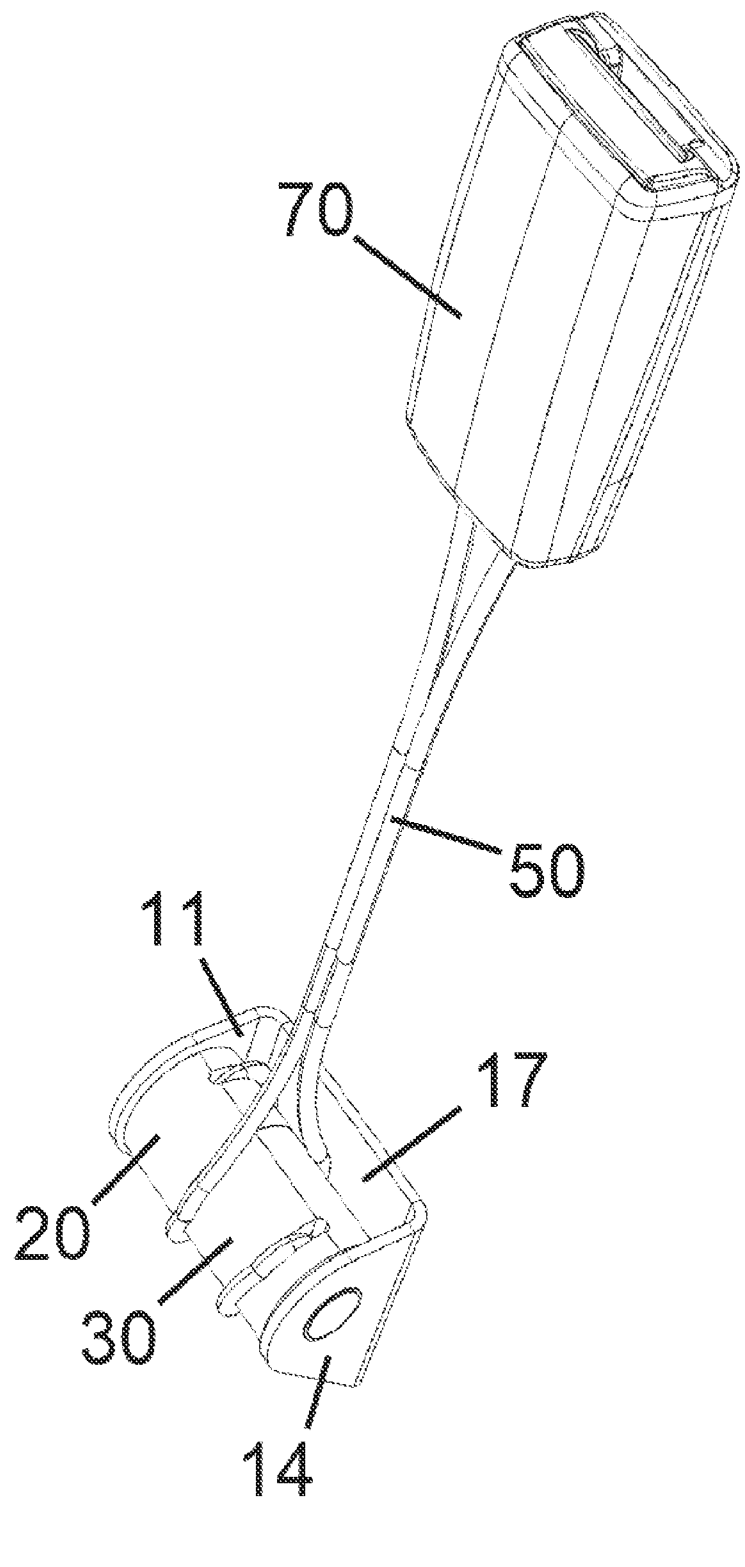
FIG. 11A is a perspective view of the energy absorbing seatbelt assembly of FIG. 1A with a buckle.
Figure 11B:
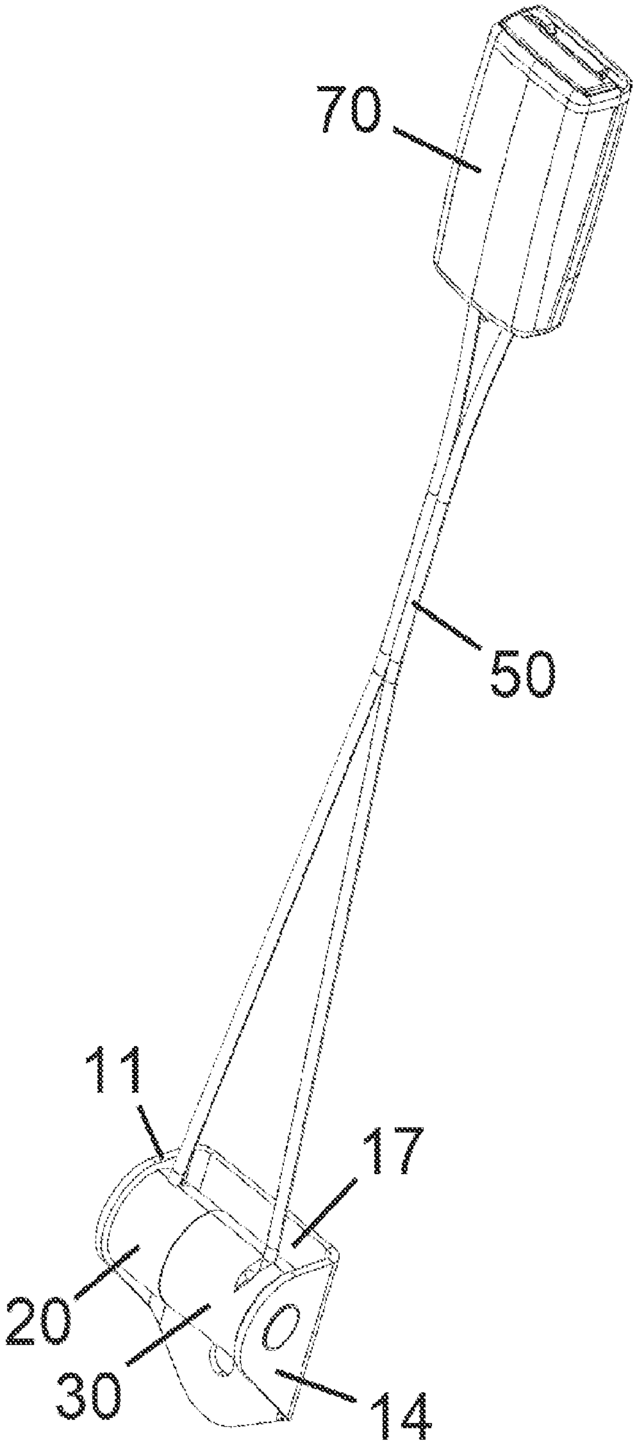
FIG. 11B is a perspective view of the energy absorbing seatbelt assembly of FIG. 1B with a buckle.
Figure 11C:
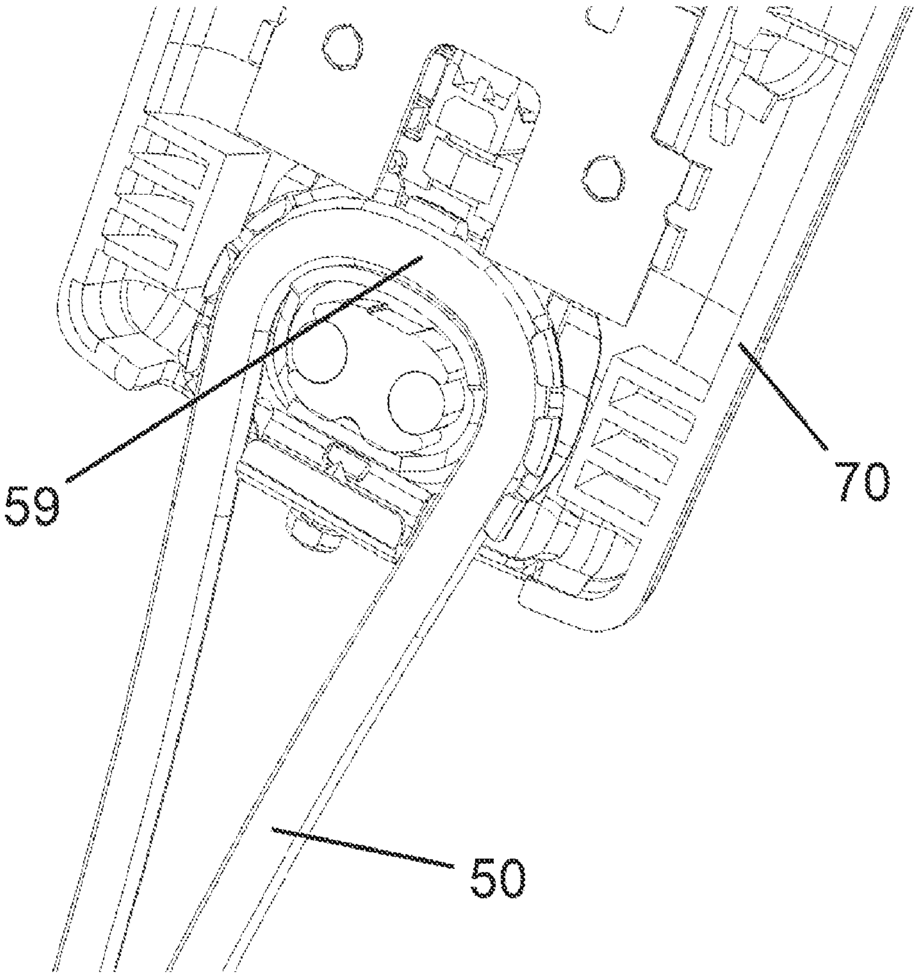
FIG. 11C is a cross-sectional view of a portion of the energy absorbing seatbelt assembly of FIG. 11A.
Figure 12:
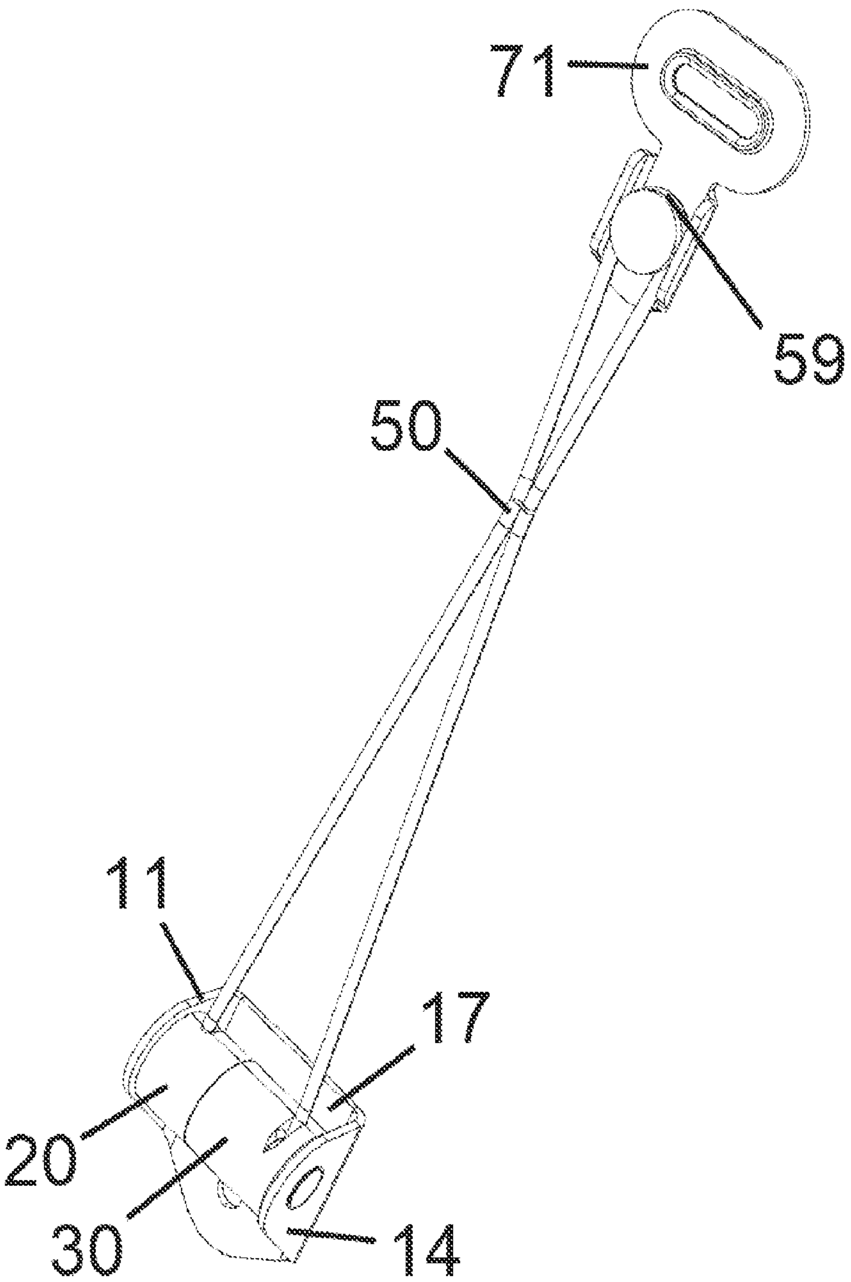
FIG. 12 is a perspective view of the energy absorbing seatbelt assembly of FIG. 1B with an anchor.

In order to rotate during a vehicle emergency event, the first spool portion 20 and the second spool portion 30 are coupled to a cable 50. A first end 51 of the cable 50 is coupled to the first spool portion 20. A second end 55 of the cable 50 is coupled to the second spool portion 30. As shown in FIGS. 11A-11C, a middle portion 59 of the cable 50 is coupled to a buckle 70. The base 17 of the frame 10 defines a third hole 18 for fixedly mounting the frame 10 to the vehicle via a fastener. Therefore, when a lap portion of a seatbelt is coupled to the buckle 70 and a vehicle emergency event occurs, the movement of an occupant's body will tension the seatbelt and pull the buckle 70 away from the frame 10, tensioning the cable 50. In other implementations, the middle portion 59 of the cable 50 is coupled to a seatbelt anchor 71, as shown in FIG. 12.

Figure 1B:
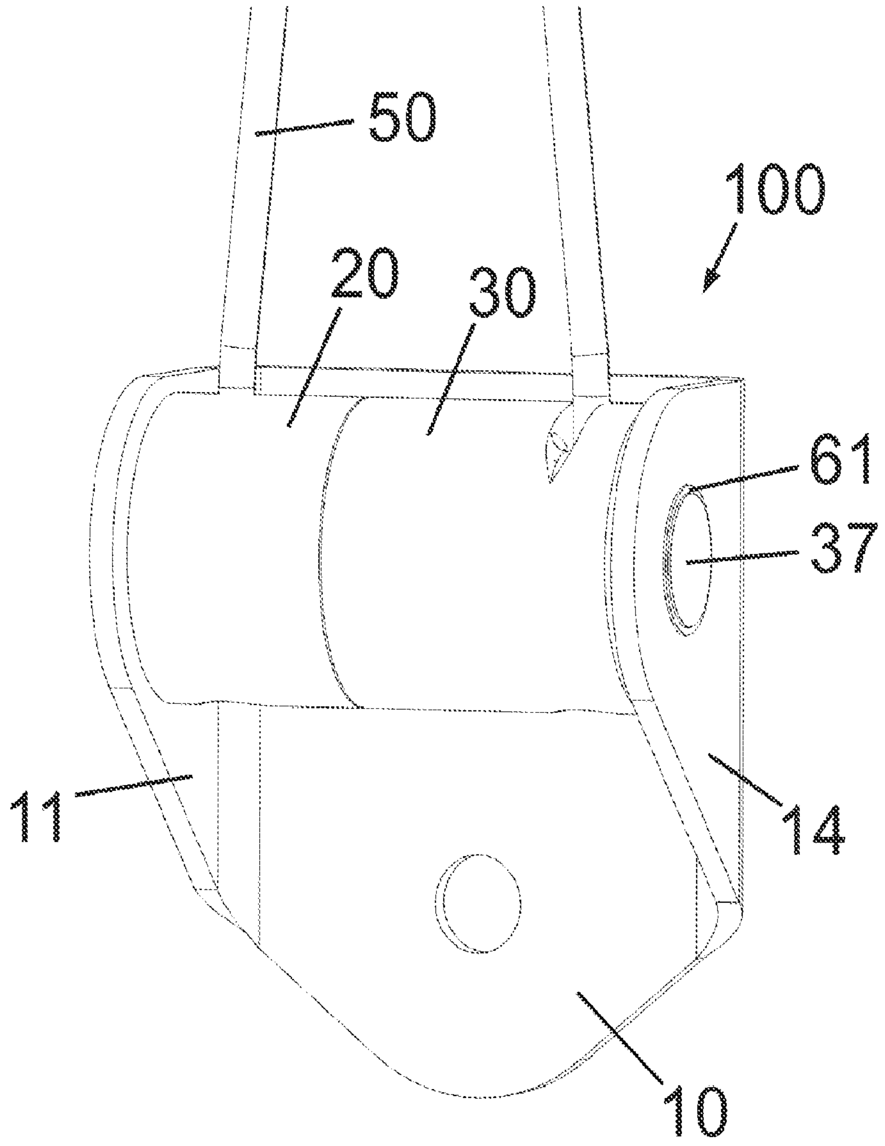
FIG. 1B is a perspective view of the energy absorbing seatbelt assembly of FIG. 1 in a post-emergency condition.
Figure 2B:
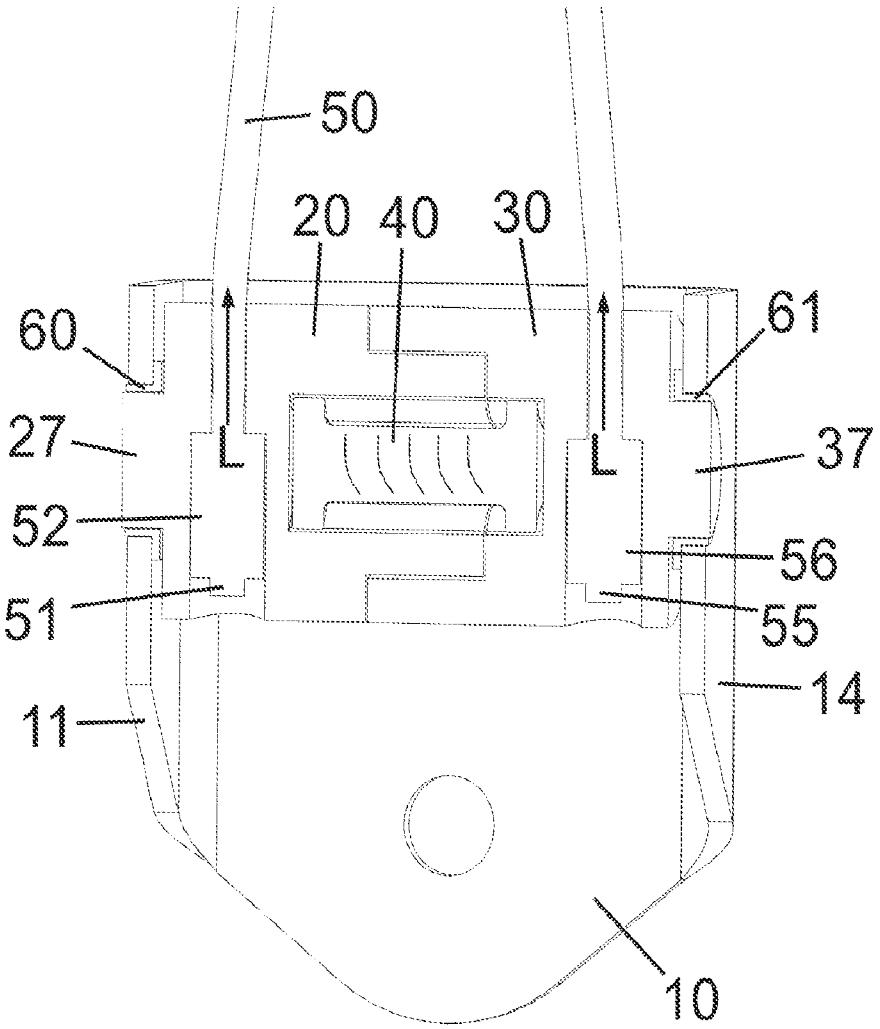
FIG. 2B is a cross-sectional view of the energy absorbing seatbelt assembly of FIG. 1B.
Figure 3A:
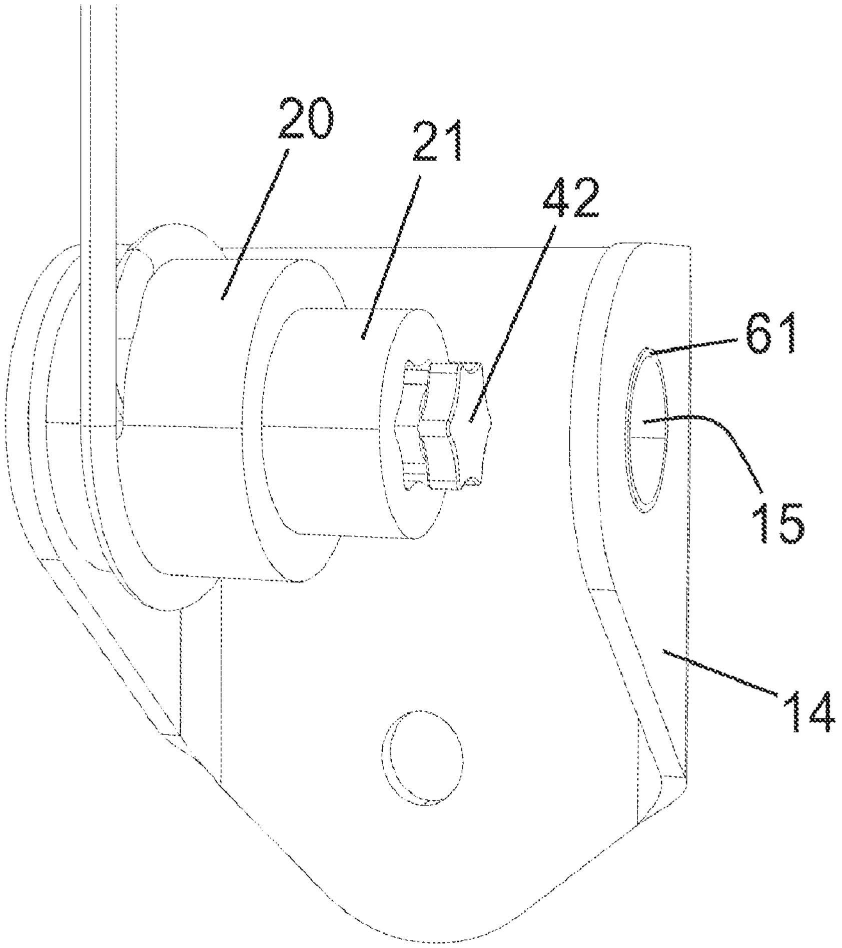
FIG. 3A is a perspective view of the energy absorbing seatbelt assembly of FIG. 1A showing a first spool portion but not a second spool portion.
Figure 3B:
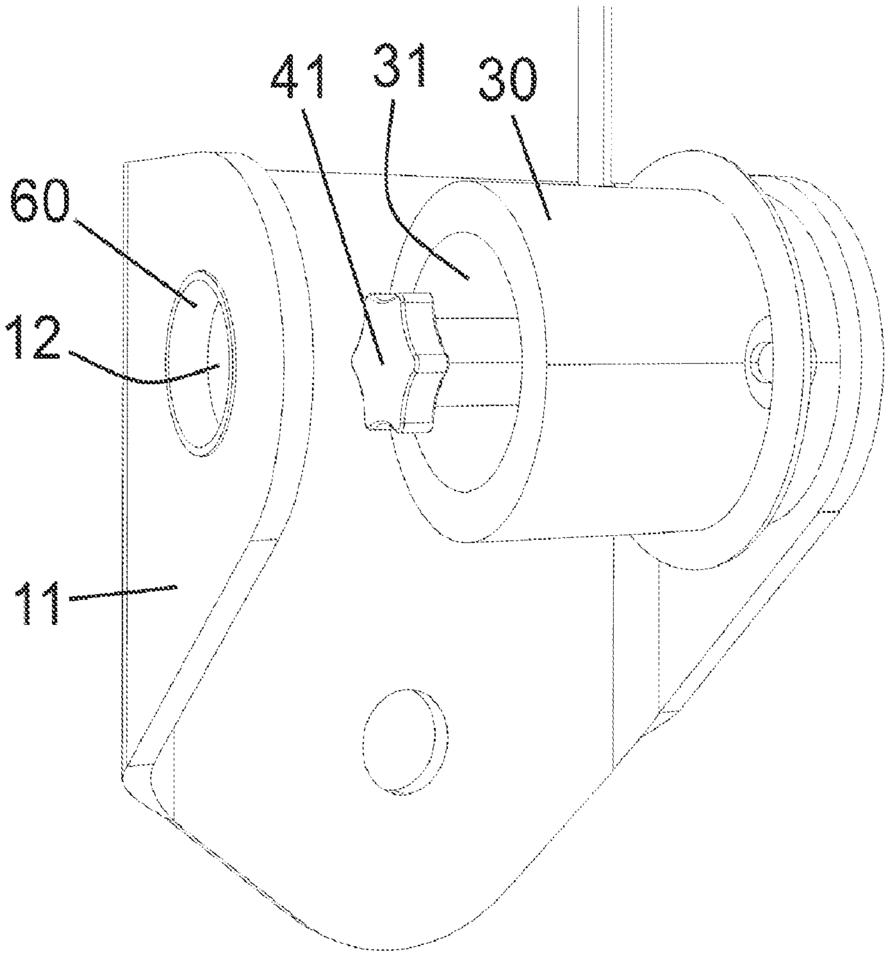
FIG. 3B is a perspective view of the energy absorbing seatbelt assembly of FIG. 1A showing the second spool portion but not the first spool portion.
Figure 4A:
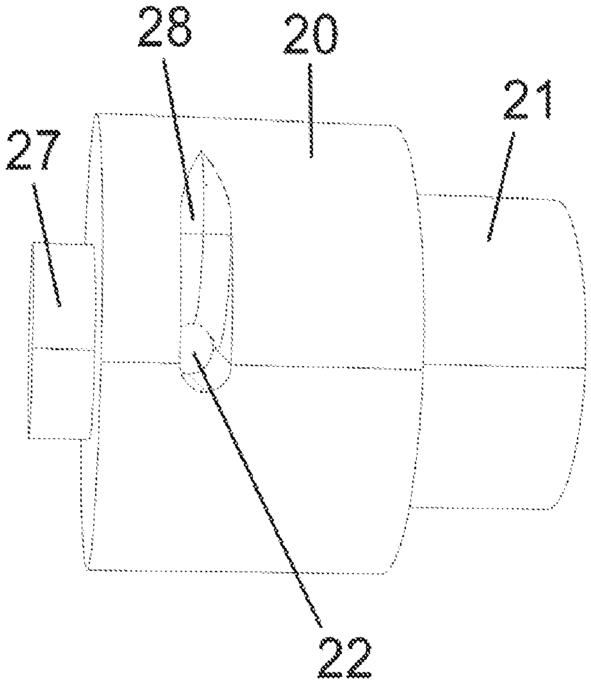
FIGS. 4A-4B are perspective views of the first spool portion of FIG. 3A.
Figure 4B:
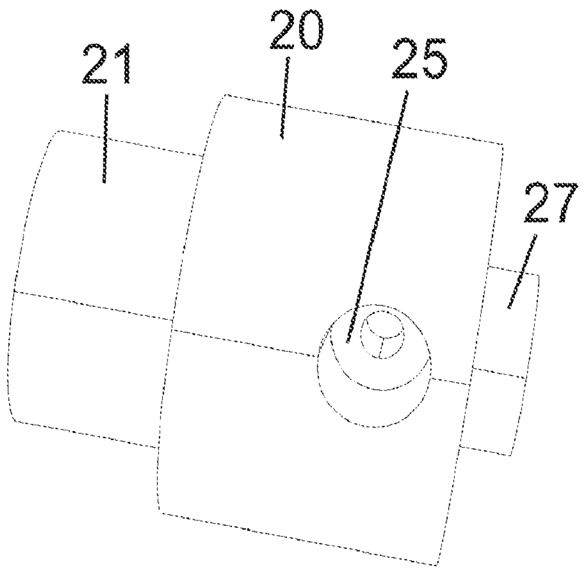
Figure 5A:
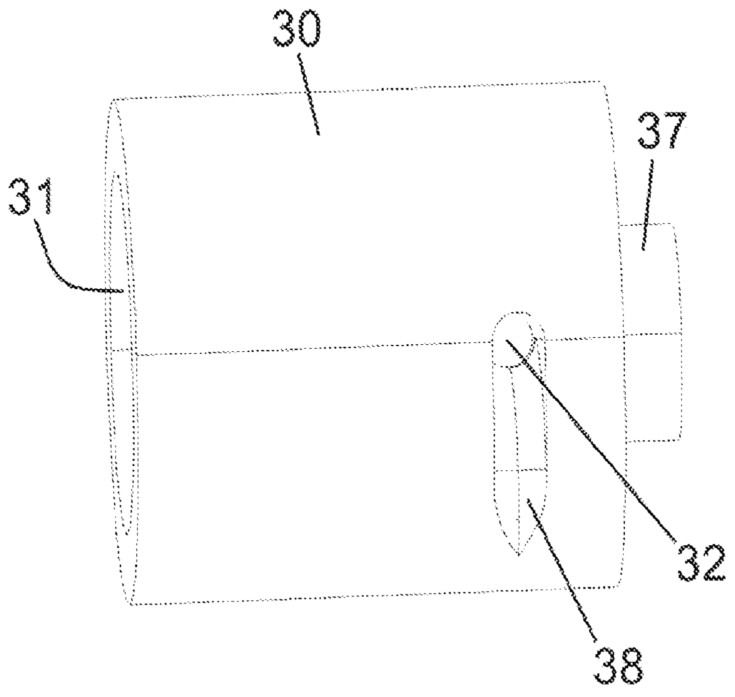
FIGS. 5A-5B are perspective views of the second spool portion of FIG. 3B.
Figure 5B:
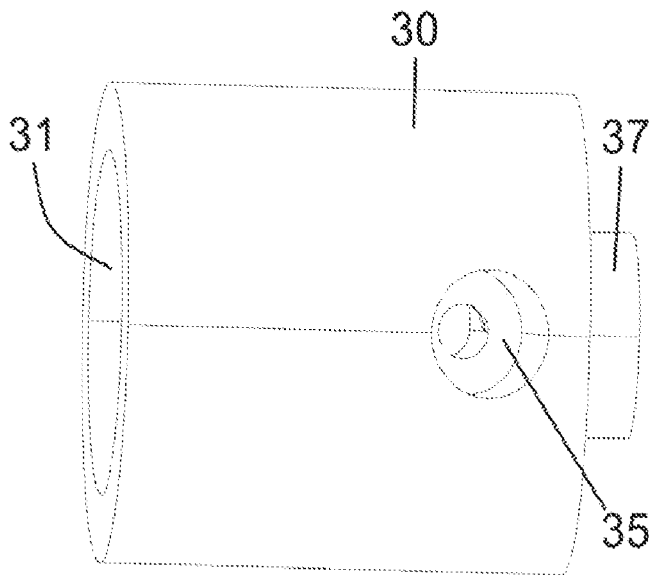
Figure 7A:
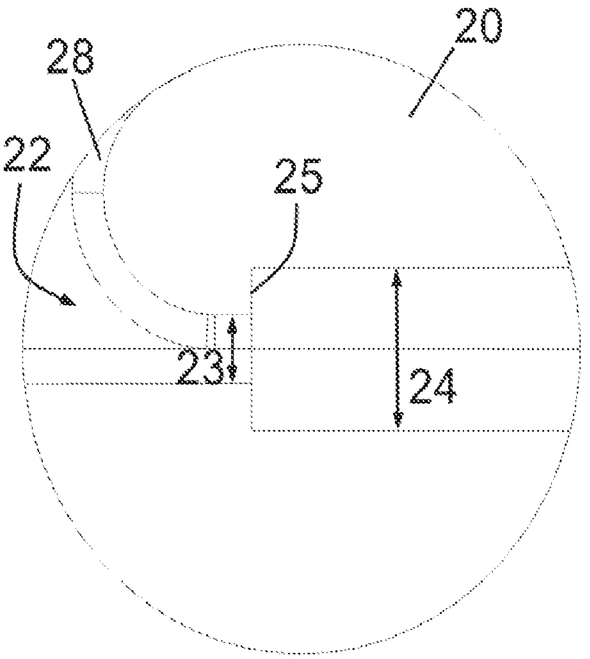
FIG. 7A is a cross-sectional view of the first spool portion of FIGS. 4A-4B.
Figure 7B:
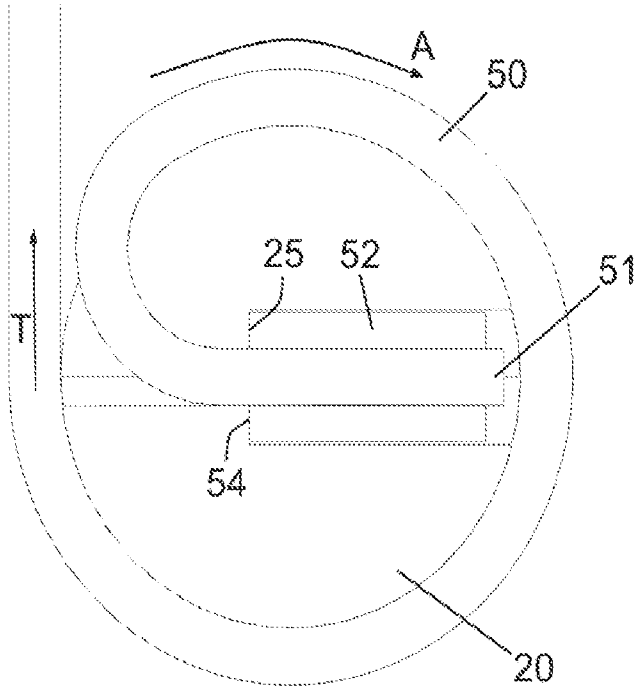
FIG. 7B is a cross-sectional view of the first spool portion of FIG. 7A with the cable.
Figure 8A:
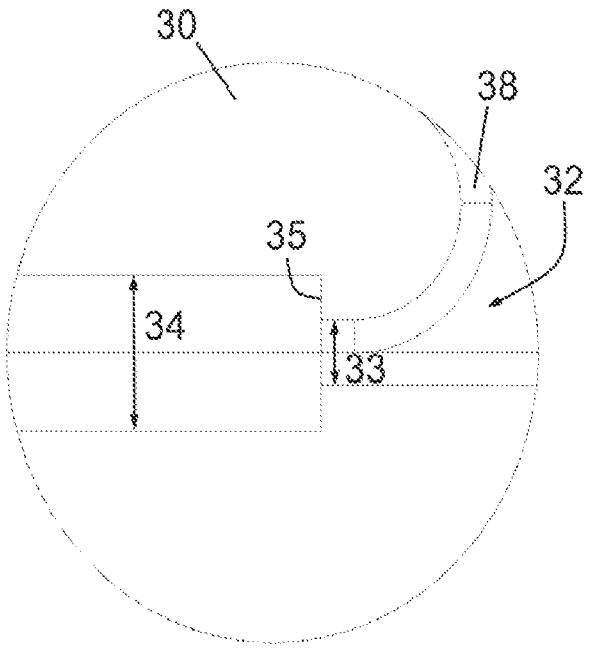
FIG. 8A is a cross-sectional view of the second spool portion of FIGS. 5A-5B.
Figure 8B:
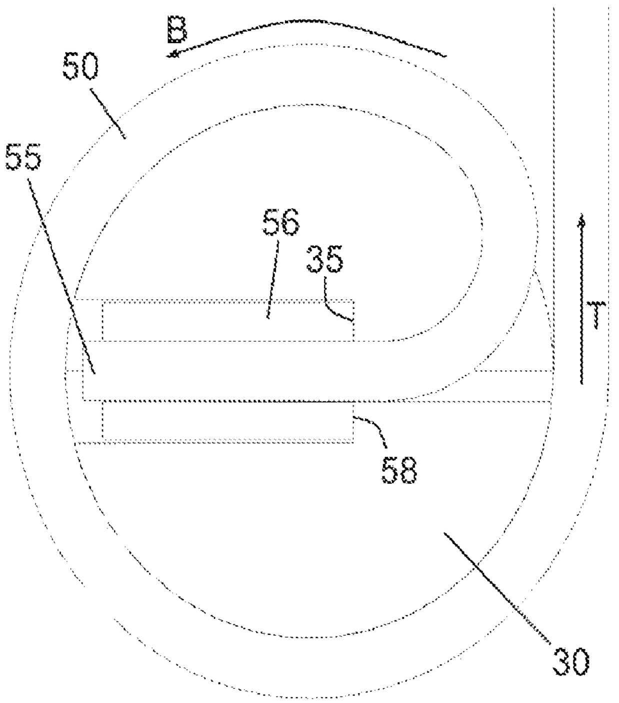
FIG. 8B is a cross-sectional view of the second spool portion of FIG. 8A with the cable.

When the cable 50 is tensioned away from the frame 10, the first end 51 of the cable 50 rotates the first spool portion 20 in a first rotational direction A, as shown in FIG. 1A. Similarly, the second end 55 of the cable 50 rotates the second spool portion 30 in a second rotational direction B which is opposite the first rotational direction A. Rotation of the first spool portion 20 and second spool portion 30 is due to tangential forces T, as shown in FIGS. 7B and 8B, applied to the first spool portion 20 and second spool portion 30 by the cable 50. FIGS. 1A and 2A show the energy absorbing seatbelt assembly 100 in a pre-emergency condition, whereas FIGS. 1B and 2B show the assembly 100 in a post-emergency condition. As can be seen particularly in FIG. 2A, the first spool portion 20 and second spool portion 30 have not started rotating in the rotational directions A and B, respectively. As such, torsion bar 40 is in a non-twisted state. As can be seen particularly in FIG. 2B, the first spool portion 20 and second spool portion 30 have been fully rotated in the rotational directions A and B, respectively. As a result, torsion bar 40 has twisted, thereby absorbing energy from the movement of the occupant's body.

Referring now to FIGS. 4A-8B, the first spool portion 20 defines a through hole 22. The through hole 22 comprises a first diameter 23 and a second diameter 24, wherein the second diameter 24 is larger than the first diameter 23. The first spool portion 20 also defines a cable ramp 28. As shown in FIG. 7B, the cable 50 is wrapped around the first spool portion 20 and extends through the through hole 22. A portion of the cable 50 lies on the cable ramp 28 when the energy absorbing seatbelt assembly 100 is in the pre-emergency condition. A first terminal 52 is crimped on or otherwise attached to the cable 50 adjacent the first end 51 of the cable 50 and is disposed within the through hole 22. The first terminal 52 comprises an outer diameter 53, as shown in FIG. 6A, that is larger than the first diameter 23 and less than the second diameter 24. As a result, during a vehicle emergency event, an end surface 54 of the first terminal 52 will abut a shoulder 25 of the first spool portion 20 as the cable 50 is tensioned by the movement of the vehicle occupant. Specifically, when the cable 50 is tensioned, a tangential force T is applied by the cable 50 to the first spool portion 20, wherein the cable ramp 28 and shoulder 25 help to allow the cable 50 to torque the first spool portion 20, causing a smooth rotation of the first spool portion 20 in the first rotational direction A.

Figure 6A:
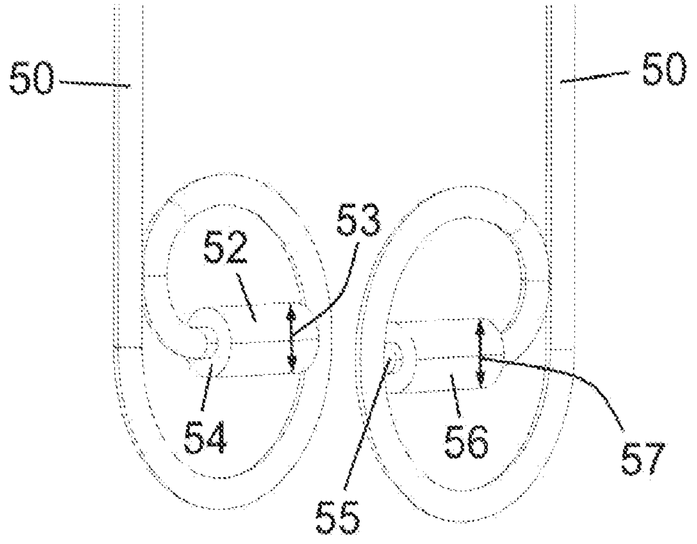
FIGS. 6A-6B are perspective views of a cable.
Figure 6B:
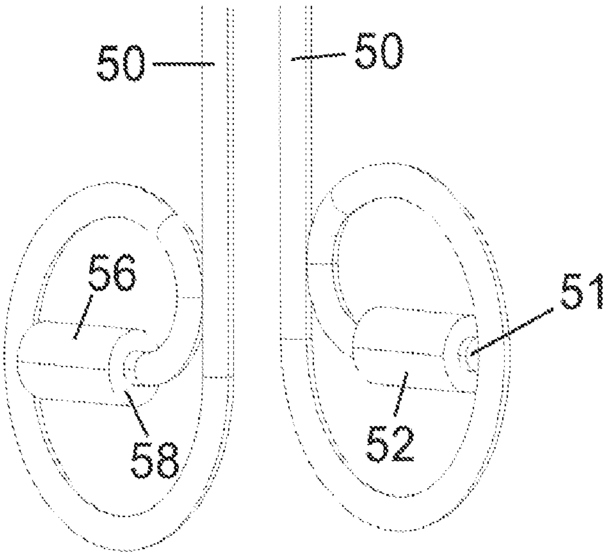

Similarly, the second spool portion 30 defines a through hole 32. The through hole 32 comprises a first diameter 33 and a second diameter 34, wherein the second diameter 34 is larger than the first diameter 33. The second spool portion 30 also defines a cable ramp 38. As shown in FIG. 8B, the cable 50 is wrapped around the second spool portion 30 and extends through the through hole 32. A portion of the cable 50 lies on the cable ramp 38 when the energy absorbing seatbelt assembly 100 is in the pre-emergency condition. A second terminal 56 is crimped on or otherwise attached to the cable 50 adjacent the second end 55 of the cable 50 and is disposed within the through hole 32. The second terminal 56 comprises an outer diameter 57, as shown in FIG. 6A, that is larger than the first diameter 33 and less than the second diameter 34. As a result, during a vehicle emergency event, an end surface 58 of the second terminal 56 will abut a shoulder 35 of the second spool portion 30 as the cable 50 is tensioned by the movement of the vehicle occupant. Specifically, when the cable 50 is tensioned, a tangential force T is applied by the cable 50 to the second spool portion 30, wherein the cable ramp 38 and shoulder 35 help to allow the cable 50 to torque the second spool portion 30, causing a smooth rotation of the second spool portion 30 in the second rotational direction B.

Figure 13A:
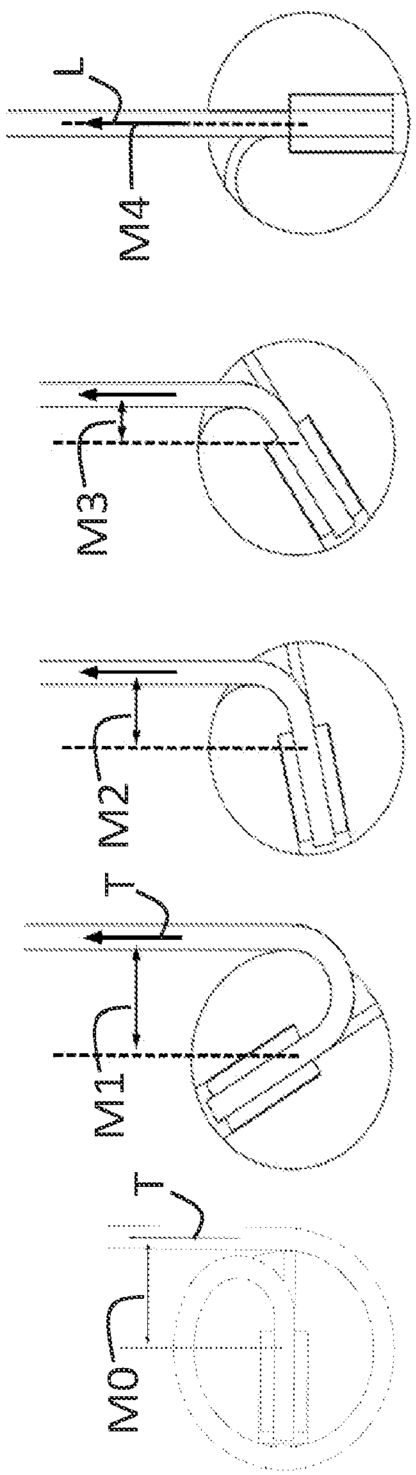
FIG. 13A is a view of multiple steps of energy absorption during operation of the energy absorbing seatbelt assembly of FIG. 1A.
Figure 13B:
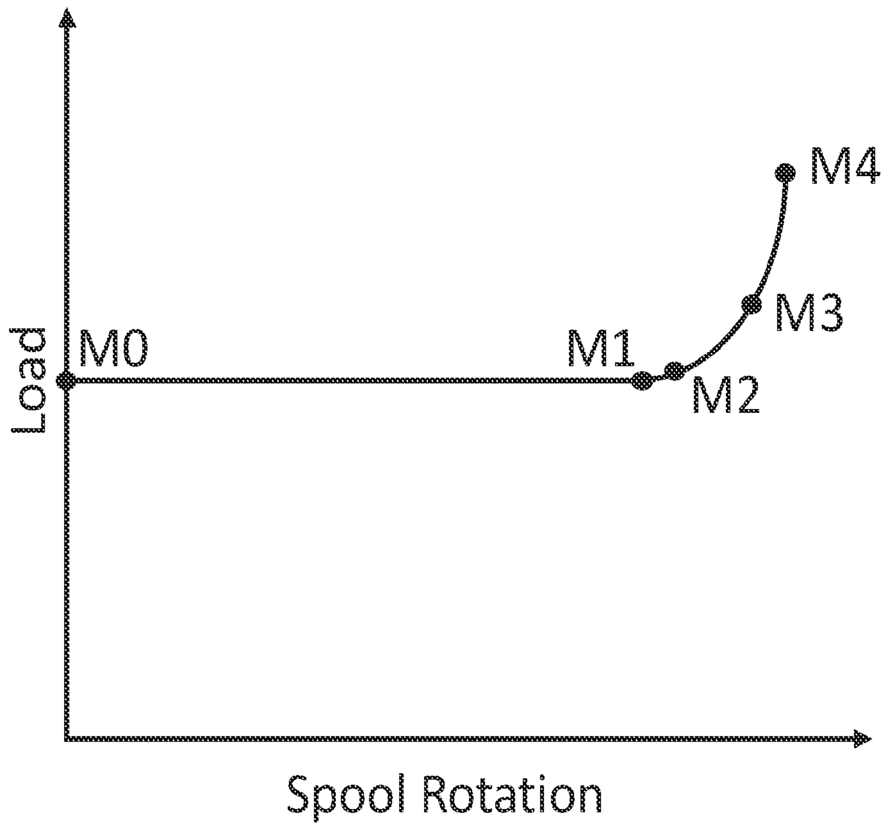
FIG. 13B is a plot of energy absorption during operation of the energy absorbing seatbelt assembly of FIG. 1A showing the multiple steps of FIG. 13A.

As the first spool portion 20 and the second spool portion 30 rotate in the rotational direction A and rotational direction B, respectively, from the pre-emergency condition shown in FIG. 1A to the post-emergency condition shown in FIG. 1B, the energy absorption profile (load), ramps up during the final quarter turn. The initial tangential forces T will transition during the final quarter turn into linear forces L, therefore reducing the moment M applied by the cable 50 to the first spool portion 20 and the second spool portion 30, as shown in FIG. 13A, wherein M0=M1>M2>M3>M4. As a result, more energy is required to continue twisting the torsion bar 40. Thus, more energy from the movement of the occupant's body is absorbed by twisting the torsion bar 40 during the final moments of energy absorption during the vehicle emergency event. An example load graph is shown in FIG. 13B, representing the load vs. the rotational position of the second spool portion 30 throughout the rotation shown in FIG. 13A. As shown, the load increases once the moment begins to transition during the final quarter turn to a maximum amount representative of the peak load applied by the occupant during a vehicle emergency event, dependent on the severity of the event.

The description in the present disclosure has been presented for purposes of illustration but is not intended to be exhaustive or limited to the implementations disclosed. It will be understood that various modifications and variations will be apparent to those of ordinary skill in the art and may be made without departing from the spirit and scope of the following claims. Accordingly, other implementations are within the scope of the claims. The implementations described were chosen in order to best explain the principles of the energy absorbing seatbelt assembly and its practical application, and to enable others of ordinary skill in the art to understand the assembly for various implementations with various modifications as are suited to the particular use contemplated.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

What is claimed is:

1. An energy absorbing seatbelt assembly for a vehicle comprising:

a frame;

a first spool portion rotatably coupled to the frame and a second spool portion rotatably coupled to the frame, the second spool portion formed separately from the first spool portion; and a torsion bar with a first end coupled to the first spool portion and a second end coupled to the second spool portion;

wherein, during a vehicle emergency event, the first spool portion rotates relative to the frame in a first direction and the second spool portion rotates relative to the frame in a second direction, the second direction being opposite to the first direction.

2. The energy absorbing seatbelt assembly of claim 1, further comprising a cable with a first end coupled to the first spool portion and a second end coupled to the second spool portion.

3. The energy absorbing seatbelt assembly of claim 2, further comprising a buckle, wherein a middle portion of the cable is coupled to the buckle, the middle portion of the cable extending between the first end of the cable and the second end of the cable.

4. The energy absorbing seatbelt assembly of claim 2, wherein the first spool portion defines a through hole and the second spool portion defines a through hole, and wherein the through hole of the first spool portion comprises a first diameter and a second diameter, and the through hole of the second spool portion comprises a first diameter and a second diameter.

5. The energy absorbing seatbelt assembly of claim 4, wherein the first end of the cable extends through the through hole of the first spool portion and the second end of the cable extends through the through hole of the second spool portion.

6. The energy absorbing seatbelt assembly of claim 5, wherein the cable further comprises a first terminal coupled adjacent the first end of the cable and a second terminal coupled adjacent the second end of the cable, the first terminal having an outer diameter and the second terminal having an outer diameter, the outer diameter of the first terminal being larger than the first diameter of the through hole of the first spool portion and the outer diameter of the second terminal being larger than the first diameter of the through hole of the second spool portion.

7. The energy absorbing seatbelt assembly of claim 6, wherein the through hole of the first spool portion further comprises a shoulder between the first diameter of the through hole of the first spool portion and the second diameter of the through hole of the first spool portion, and wherein the through hole of the second spool portion further comprises a shoulder between the first diameter of the through hole of the second spool portion and the second diameter of the through hole of the second spool portion.

8. The energy absorbing seatbelt assembly of claim 7, wherein the first terminal comprises an end surface and the second terminal comprises an end surface, and wherein the end surface of the first terminal abuts the shoulder of the first through hole and the end surface of the second terminal abuts the shoulder of the second through hole.

9. The energy absorbing seatbelt assembly of claim 1, further comprising a first bushing and a second bushing, wherein the first bushing is disposed between the frame and the first spool portion, and wherein the second bushing is disposed between the frame and the second spool portion.

10. The energy absorbing seatbelt assembly of claim 9, wherein the frame comprises a first arm and a second arm, the first arm defining a first hole and the second arm defining a second hole.

11. The energy absorbing seatbelt assembly of claim 10, wherein the first spool portion comprises a mounting extension and the second spool portion comprises a mounting extension, and wherein the mounting extension of the first spool portion extends through the first hole and the mounting extension of the second spool portion extends through the second hole.

12. The energy absorbing seatbelt assembly of claim 11, wherein the first bushing is disposed between an inner surface of the first hole and the mounting extension of the first spool portion, and wherein the second bushing is disposed between an inner surface of the second hole and the mounting extension of the second spool portion.

13. The energy absorbing seatbelt assembly of claim 10, wherein the frame further comprises a base extending between the first arm and the second arm, and wherein the base defines a third hole for mounting the frame to the vehicle using a fastener.

14. The energy absorbing seatbelt assembly of claim 1, wherein the first spool portion comprises an extension and the second spool portion comprises a cavity, and wherein the extension extends into the cavity and the second spool portion is rotatable about the extension.

15. The energy absorbing seatbelt assembly of claim 1, wherein the first end of the torsion bar comprises a non-circular shape and the second end of the torsion bar comprises a non-circular shape.

16. The energy absorbing seatbelt assembly of claim 15, wherein the first spool portion comprises a torsion bar cavity, and wherein the torsion bar cavity of the first spool portion comprises a non-circular shape that matches the non-circular shape of the first end of the torsion bar.

17. The energy absorbing seatbelt assembly of claim 16, wherein the second spool portion comprises a torsion bar cavity, and wherein the torsion bar cavity of the second spool portion comprises a non-circular shape that matches the non-circular shape of the second end of the torsion bar.

18. The energy absorbing seatbelt assembly of claim 17, wherein the first end of the torsion bar is disposed within the torsion bar cavity of the first spool portion and the second end of the torsion bar is disposed within the torsion bar cavity of the second spool portion.

19. An energy absorbing seatbelt assembly for a vehicle comprising:

a buckle;

a frame;

a first spool portion rotatably coupled to the frame and a second spool portion rotatably coupled to the frame, the second spool portion formed separately from the first spool portion;

a torsion bar with a first end coupled to the first spool portion and a second end coupled to the second spool portion; and a cable with a first end coupled to the first spool portion, a second end coupled to the second spool portion, and a middle portion coupled to the buckle, the middle portion of the cable extending between the first end of the cable and the second end of the cable;

wherein, during a vehicle emergency event, the cable is tensioned causing the first spool portion to rotate relative to the frame in a first direction and the second spool portion to rotate relative to the frame in a second direction, the second direction being opposite to the first direction.

20. An energy absorbing seatbelt assembly for a vehicle comprising:

a frame;

a first spool portion rotatably coupled to the frame and a second spool portion rotatably coupled to the frame, the second spool portion formed separately from the first spool portion; and a torsion bar with a first end coupled to the first spool portion and a second end coupled to the second spool portion;

wherein the first spool portion comprises a spool extension and the second spool portion comprises a spool cavity, wherein the spool extension extends into the spool cavity and the second spool portion is rotatable about the spool extension; and wherein, during a vehicle emergency event, the first spool portion rotates relative to the frame and the second spool portion in a first direction and the second spool portion rotates relative to the frame and the first spool portion in a second direction, the second direction being opposite to the first direction.

* * * * *